US009229275B2

(12) United States Patent
Park et al.

(10) Patent No.: US 9,229,275 B2
(45) Date of Patent: Jan. 5, 2016

(54) DISPLAY PANEL AND DISPLAY APPARATUS INCLUDING THE SAME

(71) Applicant: Samsung Display Co., Ltd., Yongin (KR)

(72) Inventors: JeongMin Park, Seoul (KR); Ji-Hyun Kim, Seoul (KR); Sungkyun Park, Suwon-si (KR); Jung-Soo Lee, Seoul (KR); Jun Chun, Yongin-si (KR); Jinho Ju, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 143 days.

(21) Appl. No.: 14/173,363

(22) Filed: Feb. 5, 2014

(65) Prior Publication Data

US 2015/0061984 A1  Mar. 5, 2015

(30) Foreign Application Priority Data

Sep. 5, 2013  (KR) .................. 10-2013-0106789

(51) Int. Cl.
*G09G 3/36* (2006.01)
*G02F 1/1337* (2006.01)
(Continued)

(52) U.S. Cl.
CPC .... *G02F 1/133707* (2013.01); *G02F 1/133509* (2013.01); *G02F 1/136227* (2013.01); *G02F 2001/134372* (2013.01); *G02F 2201/40* (2013.01)

(58) Field of Classification Search
CPC ............... G02F 1/133345; G02F 1/136227; G02F 1/136286; G02F 1/1368; G02F 1/134363; G02F 1/134309; G02F 1/1333; G02F 1/1339; G02F 1/134336; G02F 1/133514; G02F 1/13439; G02F 1/133512; G02F 1/136209; G02F 2001/134372; G02F 2001/134318; G02F 2001/1351; G02F 2001/136236; G02F 2201/123; H01L 29/408; H01L 29/41733; H01L 29/66969; H01L 29/7869; H01L 29/786; H01L 29/78696; H01L 29/78669; H01L 27/3262; H01L 27/1288; H01L 27/088; H01L 27/1251; H01L 27/127; H01L 27/3244; H01L 21/77; H01L 33/42; H01L 33/58; H01L 51/5284; H01L 23/5329; G09G 2300/0434
USPC .................. 345/94, 98–101, 87; 257/59, 57, 257/E29.273, E21.409, E33.053, E33.062, 257/E33.068; 349/43, 106, 139, 143, 110, 349/138, 141, 187; 204/192.25
See application file for complete search history.

(56) References Cited

U.S. PATENT DOCUMENTS 7,502,087 B2  3/2009  Kim et al.
8,018,541 B2  9/2011  Lee et al.
(Continued)

FOREIGN PATENT DOCUMENTS

KR       10-0835112      6/2008
KR    10-2008-0062641    7/2008
(Continued)

*Primary Examiner* — Kent Chang
*Assistant Examiner* — Nelson Rosario
(74) *Attorney, Agent, or Firm* — H.C. Park & Associates, PLC (57) ABSTRACT

A display apparatus includes a first substrate, a second substrate disposed on the first substrate, and a controllable layer disposed between the first and second substrates. The first substrate includes a pixel. The pixel includes a display region and a non-display region. The first substrate further includes: a transistor disposed in the non-display region; a protection layer disposed on and covering the transistor; a first electrode disposed on the protection layer; and a second electrode disposed on the first electrode, the second electrode being insulated from the first electrode and including a slit disposed in the display region. One of the first electrode and the second electrode is electrically connected to the transistor via a contact hole extending through the protection layer. The other of the first electrode and the second electrode is configured to receive a common voltage. The contact hole and the slit do not overlap one another.

20 Claims, 10 Drawing Sheets

(51) Int. Cl.
  *G02F 1/1335* (2006.01)
  *G02F 1/1362* (2006.01)
  *G02F 1/1343* (2006.01)

(56) References Cited

U.S. PATENT DOCUMENTS

| | | | |
|---|---|---|---|
| 8,023,088 B2 * | 9/2011 | Nakao | G02F 1/134363 349/139 |
| 8,134,672 B2 | 3/2012 | Fujita et al. | |
| 8,325,308 B2 | 12/2012 | Nishimura et al. | |
| 8,817,214 B2 * | 8/2014 | Park | G02F 1/134363 349/141 |
| 2013/0063673 A1 | 3/2013 | Choi et al. | |

FOREIGN PATENT DOCUMENTS

| KR | 10-2008-0062647 | 7/2008 |
| KR | 10-2011-0012111 | 2/2011 |
| KR | 10-1201324 | 11/2012 |
| KR | 10-2013-0030128 | 3/2013 |
| KR | 10-1264715 | 5/2013 |

* cited by examiner

DISPLAY PANEL AND DISPLAY APPARATUS INCLUDING THE SAME

CROSS-REFERENCE TO RELATED APPLICATION

This application claims priority from and the benefit of Korean Patent Application No. 10-2013-0106789, filed on Sep. 5, 2013, which is incorporated by reference for all purposes as if set forth herein.

BACKGROUND

1. Field

Exemplary embodiments relate to display technology, and, more particularly, to a display panel configured to improve display quality and a display apparatus including the same.

2. Discussion

Conventional liquid crystal displays typically include two substrates and a liquid crystal layer disposed between the two substrates. The intensity of an electric field applied to the liquid crystal layer may be controlled to control the intensity of light transmitted through the liquid crystal layer from a light source, such as a backlight. An image may be displayed based on the intensity of the light transmitted through the liquid crystal layer.

Liquid crystal displays typically have narrower viewing angles than other types of conventional flat panel displays. In-plane switching methods have been utilized to address this issue. For instance, an in-plane switching method may horizontally apply an electric field to the liquid crystal layer to rearrange liquid crystal molecules in a plane. It is also noted that fringe field switching (FFS) or plane-to-line switching (PLS) modes of the in-plane switching method have been developed. In the FFS or PLS mode, a first electrode and a second electrode including a slit may be transparently formed to improve transmittance and color reproducibility.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display panel configured to improve display quality, as well as increase the aperture ratio of a pixel.

Exemplary embodiments provide a display apparatus configured to improve display quality, as well as increase the aperture ratio of a pixel.

Additional aspects will be set forth in the detailed description which follows, and, in part, will be apparent from the disclosure, or may be learned by practice of the inventive concept.

According to exemplary embodiments, a display apparatus includes a first substrate, a second substrate disposed on the first substrate, and a controllable layer disposed between the first substrate and the second substrate. The first substrate includes a pixel. The pixel includes a display region and a non-display region. The first substrate further includes: a transistor disposed in the non-display region; a protection layer disposed on and covering the transistor; a first electrode disposed on the protection layer; and a second electrode disposed on the first electrode. The second electrode is insulated from the first electrode and includes a slit disposed in the display region. One of the first electrode and the second electrode is electrically connected to the transistor via a contact hole extending through the protection layer. The other of the first electrode and the second electrode is configured to receive a common voltage. The contact hole and the slit do not overlap one another.

According to exemplary embodiments, a display panel includes a substrate including a pixel, the pixel including a display region and a non-display region. The display panel further includes: a transistor disposed on the substrate and in the non-display region; a protection layer disposed on and covering the transistor; a first electrode disposed on the protection layer; and a second electrode disposed on the protection layer, the second electrode being insulated from the first electrode and including a slit disposed in the display region. One of the first electrode and the second electrode is electrically connected to the transistor via a contact hole extending through the protection layer. The contact hole and the slit do not overlap one another.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
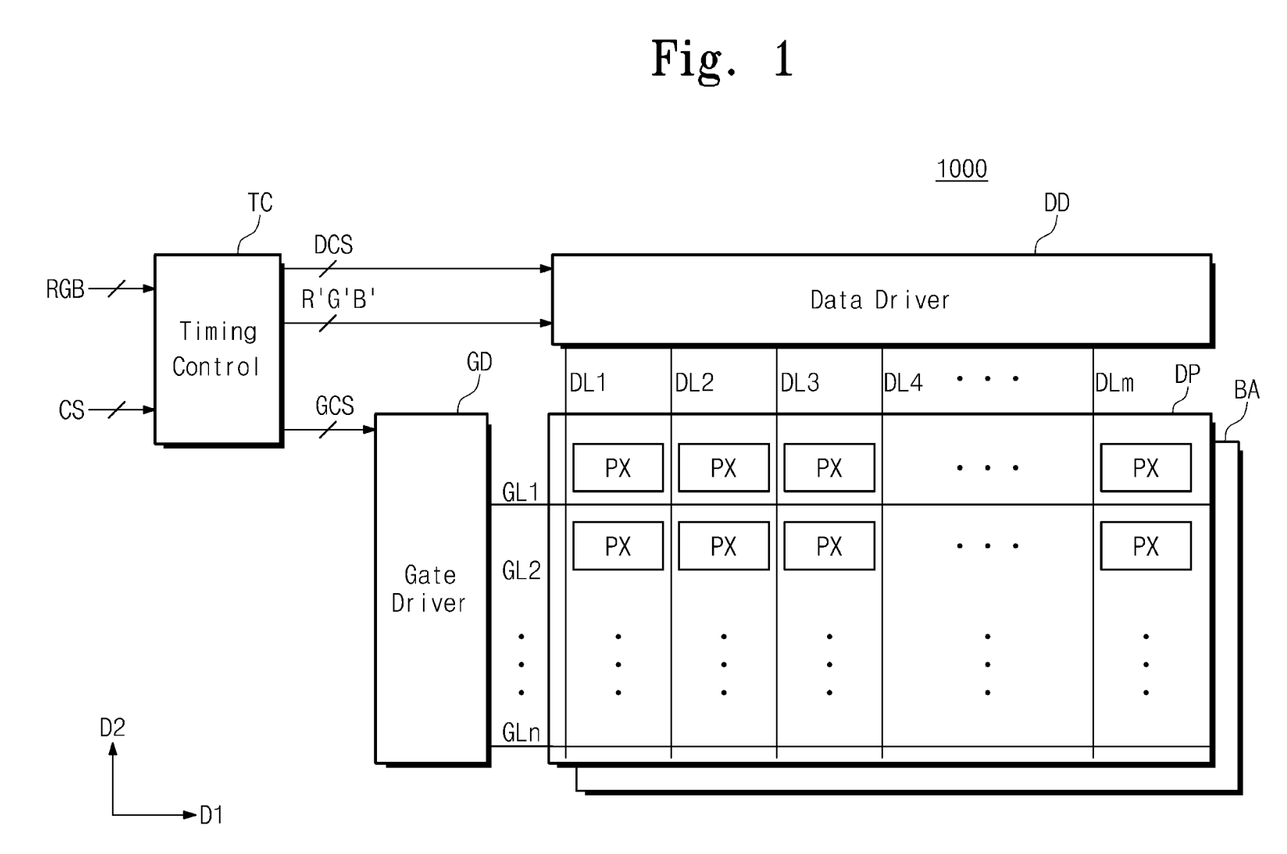
FIG. 1 is a block diagram of a liquid crystal display apparatus, according to exemplary embodiments.

FIG. 1 is a block diagram of a liquid crystal display apparatus, according to exemplary embodiments.

Referring to FIG. 1, the liquid crystal display apparatus 1000 may include a display panel DP including a plurality of signal lines and a plurality of pixels PX connected to the signal lines. The pixels PX may be arranged in any suitable formation, such as, for example, substantially arranged in a matrix formation. The plurality of signal lines may include a plurality of gate lines GL1 to GLn receiving gate signals and a plurality of data lines DL1 to DLm receiving data voltages, where "n" and "m" are natural numbers greater than zero. The gate lines GL1 to GLn substantially extend in a first direction D1 (e.g., a row direction) and are arranged (e.g., spaced apart from one another) in a second direction D2 (e.g., a column direction) to be parallel (or substantially parallel) to each other. The data lines DL1 to DLm substantially extend in the second direction and are arranged in the first direction to be parallel (or substantially parallel) to each other. Although not illustrated in FIG. 1, each pixel PX may be connected to a corresponding gate line of the gate lines GL1 to GLn and a corresponding data line of the data lines DL1 to DLm. To this end, each pixel PX may generate an image based on one or more signals received via the corresponding gate lien of the gate lines GL1 to GLn and the corresponding data line of the data lines DL1 to DLn.

According to exemplary embodiments, the liquid crystal display apparatus 1000 controls the polarization of light received from a backlight assembly BA in response to signals provided from one or more driving parts to display an image. The driving part(s) may include a timing controller TC, a gate driver GD, and a data driver DD.

The timing controller TC receives an input image signal RGB and a control signal CS including image information from a source (e.g., an external source) and outputs image data R'G'B' and various control signals DCS and GCS based on an operation mode of the liquid crystal display apparatus 1000. In exemplary embodiments, the various control signals DCS and GCS may include a data driving control signal DCS and a gate driving control signal GCS.

The data driver DD receives the data driving control signal DCS and the image data R'G'B' from the timing controller TC. The data driver DD generates a plurality of data signals including image information, such as gradation information, on the basis of the data driving control signal DCS and the image data R'G'B'. For example, the data signals may be generated to have a data voltage corresponding to the image information. The plurality of data signals may be provided to the plurality of data lines DL1 to DLm.

The gate driver GD receives the gate driving control signal GCS from the timing controller TC. The gate driver GD generates a plurality of gate signals on the basis of the gate driving control signal GCS. The gate signals may be sequentially and periodically provided to the gate lines GL1 to GLn.

Figure 2:
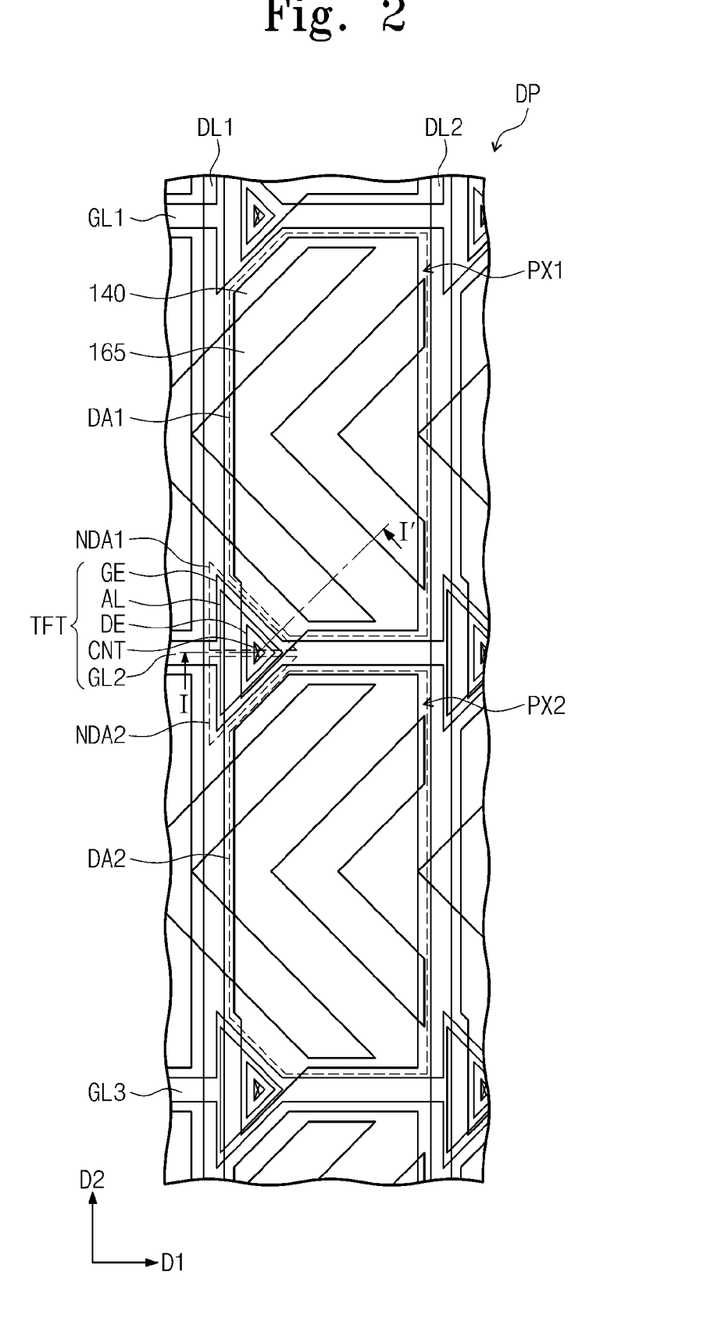
FIG. 2 is an enlarged plan view of a display panel of the liquid crystal display apparatus of FIG. 1, according to exemplary embodiments.
Figure 3:
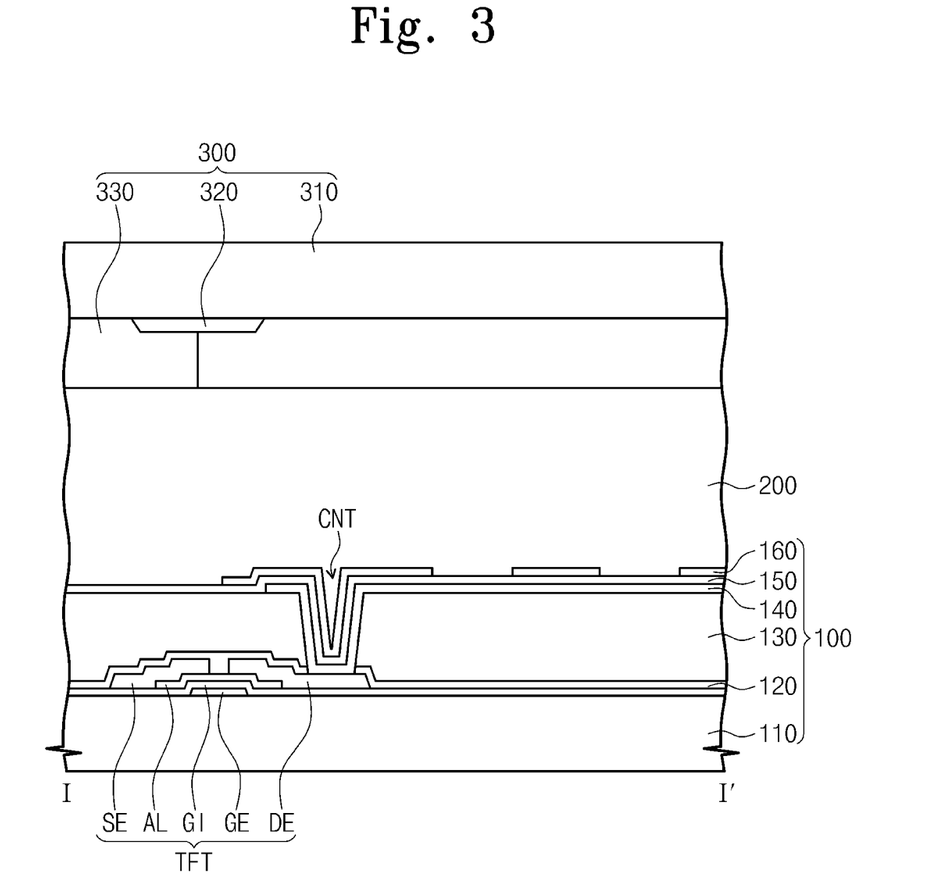
FIG. 3 is a cross-sectional view of the display panel of FIG. 2 taken along a sectional line I-I', according to exemplary embodiments.

FIG. 2 is an enlarged plan view of a portion of a display panel of the liquid crystal display apparatus of FIG. 1, according to exemplary embodiments. FIG. 3 is a cross-sectional view of the display panel of FIG. 2 taken along sectional line I-I'. It is noted that the pixels PX of the liquid crystal display apparatus 1000 may have substantially the same structure and function. As such, two adjacent pixels PX1 and PX2 are illustrated in FIG. 2 as exemplary pixels PX of the liquid crystal display apparatus 1000.

Referring to FIG. 2, the display panel may include first pixel PX1 and second pixel PX2. In this manner, each pixel may include at least one non-display region and at least one display region. For example, the first pixel PX1 may include a first display region DA1 and a first non-display region NDA1, whereas the second pixel PX2 may include a second display region DA2 and a second non-display region NDA2. It is noted that the display regions and the non-display regions do not overlap each other. As such, an image generated via, for example, the first pixel PX1 may be displayed via the first display region DA1, and, thereby, not displayed via the first non-display region NDA1.

FIG. 3 is a cross-sectional view of the display panel of FIG. 2 taken along a sectional line I-I', according to exemplary embodiments.

Referring to FIG. 3, the liquid crystal display apparatus 1000 includes a first substrate 100 including a thin film transistor TFT, a liquid crystal layer 200, and a second substrate 300 disposed on the first substrate 100. The second substrate 300 includes a second base substrate 310, a black matrix 320, and a color filter 330. The second substrate 300 faces and is combined with (or otherwise coupled to) the first substrate 100.

In exemplary embodiments, the color filer 330 may be disposed on the second base substrate 310. For example, the color filer 330 may be one of any suitable color, such as, for instance, a red color filer, a green color filter, and a blue color filter that transmit red light, green light, and blue light, respectively. Again, however, any additional or alternative color (or combination of colors) may be utilized. The color filter 330 may be provided as a plurality of color filters 330. In this manner, each of the plurality of color filters 330 may be disposed on (or otherwise in association with) a corresponding one of the pixels PX.

The black matrix 320 shields or otherwise blocks incident light from being transmitted therethrough. In this manner, a region of a pixel PX disposed in correspondence with the black matrix 320 does not display an image. That is, the black matrix 320 shields light received from the backlight assembly BA and may be disposed in association with the gate lines GL1 to GLn and the data lines DL1 to DLm. Additionally, the black matrix 320 may be formed in a non-display region to shield light in a region including the thin film transistor TFT disposed in the non-display region, such as the first non-display region NDA1. Although not shown, the black matrix 320 may be formed to surround the first pixel PX1. The black matrix 320 may have a lattice-shape, which defines the first display region DA1 of the first pixel PX1 when viewed from a plan view. In this manner, the black matrix 320 may define each of the respective display regions of each of the pixels PX. It is also noted that the black matrix 320 may be formed by patterning a chrome (Cr) thin film, a chrome oxide ($Cr_xO_y$) thin film, a black organic film having a substantially similar light transmittance (blocking feature) as the chrome thin film, or any other suitable material. In this manner, an aperture ratio of a pixel PX may be determined based on the amount of area occupied by a non-display region in which the thin film transistor TFT may be disposed. In other words, as an area of a non-display region becomes smaller, the display region may become larger, which increases the aperture ratio of the pixel PX.

Based on an applied electric field, the liquid crystal layer 200 may control light transmittance therethrough. The liquid crystal layer 200 may include a plurality of liquid crystal molecules having a dielectric anisotropy. For example, the liquid crystal molecule may have a positive dielectric constant, such that a long axis of the liquid crystal molecules may be arranged parallel (or substantially parallel) to an applied electric field. It is contemplated, however, that any other suitable type or form of liquid crystal molecules may be utilized in association with exemplary embodiments described herein. For instance, the liquid crystal molecules may have a negative dielectric anisotropy, such that a long axis of the liquid crystal molecules may be arranged in a perpendicular (or substantially perpendicular) direction to an applied electric field. To this end, the liquid crystal molecules may be homogeneously aligned in a horizontal direction with respect to the first substrate 100 and the second substrate 300.

In exemplary embodiments, when an electric field is applied between the first substrate 100 and the second substrate 300, the liquid crystal molecules may be rearranged in a direction between the first substrate 100 and the second substrate 300 to control the transmittance of light propagating therethrough. That is, light being received by the liquid crystal layer 200 may be controlled, and, thereby, polarized by the liquid crystal molecules. In this manner, the polarized light may be transmitted through or shielded by one or more polarization layers (not shown) disposed between the first substrate 100 and the second substrate 300. It is noted that the term "rearrange" may refer to the liquid crystal molecules being rotated in a plane parallel (or substantially parallel) to the first substrate 100 or the second substrate 300 and, thereby, leaning or lying in a plane vertical (or substantially vertical) to the first substrate 100 or the second substrate 300. Additionally, the term "rearrange" may also refer to the alignment of the liquid crystal molecules being changed (or otherwise controlled) by an applied electric field.

According to exemplary embodiments, the first substrate 100 may include a first base substrate 110, the thin film transistor TFT, a protection layer 130, a first electrode 140, a second insulating layer 150, and a second electrode 160. With respect to FIG. 2, the first substrate 100 may also include first through third gate lines GL1 through GL3 extending in the first direction D1 and first and second data lines DL1 and DL2 extending in the second direction D2. It is noted, however, that the first substrate may include the plurality of gate lines GL1 to GLn and the plurality of data lines DL1 to DLm.

Referring to FIGS. 2 and 3, the thin film transistor TFT may be disposed in the first non-display region NDA1 associated with the first pixel PX1 and the second non-display region NDA2 associated with the second pixel PX2. The thin film transistor TFT may control the electric field generated in (or otherwise applied to) the liquid crystal layer 200 by providing a data voltage to the first electrode 140. In this manner, the thin film transistor TFT controls the image generated via the first pixel PX1. The thin film transistor TFT may include a gate electrode GE, a source electrode SE, and a drain electrode DE. It is noted that the functions of the source electrode SE and the drain electrode DE may be switched, such that the source electrode SE functions as a drain electrode DE and the drain electrode DE functions as a source electrode SE.

According to exemplary embodiments, the thin film transistor TFT may be electrically connected to the second gate line GL2, the first data line DL1, and the first electrode 140 to provide a data voltage to the first pixel PX1 based on the reception of a gate voltage received via the second gate line GL2. The gate electrode GE may extend from the second gate line GL2 and may be formed on the first base substrate 110. A gate insulating layer GI may be disposed on the gate electrode GE. The gate insulating layer GI may cover the gate electrode GE. The gate insulating layer GI may include any suitable material, such as, for example, any suitable organic material, inorganic material, or a combination thereof.

A semiconductor layer AL may be disposed on the gate electrode GE with the gate insulating layer GI disposed therebetween. The source electrode SE is disposed on a portion of the gate electrode GE with the semiconductor layer AL disposed therebetween. The drain electrode DE is spaced apart and insulated from the source electrode SE. The drain electrode DE is disposed on another portion of the gate electrode GE with the semiconductor layer AL disposed therebetween.

In exemplary embodiments, a contact hole CNT extends through the protection layer 130 on the drain electrode DE to expose the drain electrode DE. An optional first insulating layer 120 may be disposed between the thin film transistor TFT and the protection layer 130. In this manner, the contact hole CNT may extend through the protection layer 130 and the optional first insulating layer 120 to expose the drain electrode DE. To this end, the first electrode 140 may extend into the contact hole CNT to be electrically connected to the drain electrode DE. As such, the first electrode 140 may receive a data voltage from the thin film transistor TFT to control an image generated via the first pixel PX1. That is, the first electrode 140 receives the data voltage from the thin film transistor TFT to generate an electric field along with the second electrode 160 in the liquid crystal layer 200. The liquid crystal molecules may be rearranged based on the imposition of the electric field.

The first electrode 140 and/or the second electrode 160 may be formed of any suitable transparent conductor material, such as, for example, aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline, poly(3,4-ethylenedioxythiophene) poly(styrenesulfonate) (PEDOT:PSS), etc.

The second insulating layer 150 may be disposed between the first electrode 140 and the second electrode 160 to electrically insulate the first electrode 140 from the second electrode 160. The second electrode 160 receives a common voltage to generate the electric field along with the first electrode 140. In this manner, the liquid crystal molecules of the liquid crystal layer 200 may be rearranged by the electric field. The second electrode 160 may have a plate-shape disposed on an entire (or substantially entire) surface of first base substrate 110. It is noted, however, that the second electrode 160 may include one or more slits 165 disposed in the display region DA. The slit(s) 165 may also be formed in a region in which the data lines DL1 to DLm or the gate lines GL1 to GLn are formed.

According to exemplary embodiments, when the data voltage and the common voltage are respectively applied to the first electrode 140 and the second electrode 160, the first electrode 140 and the second electrode may generate a fringe field including a horizontal electric field and a non-horizontal electric field due to the presence of the slit(s) 165. In this manner, the liquid crystal molecules of the liquid crystal layer 200 may be rotated based on the imposition of the horizontal electric field, and, thereby, rearranged in a plane parallel to the first base substrate 110 by the horizontal electric field in an initial stage. The liquid crystal molecules may also be applied with a vertical electric field, and, thereby, caused to rotate in a plane parallel to the first base substrate 110 by an elastic force caused by the liquid crystal molecules being rearranged by the horizontal electric field. In this manner, the liquid crystal molecules applied with the vertical electric field may also be rearranged.

Figure 4:
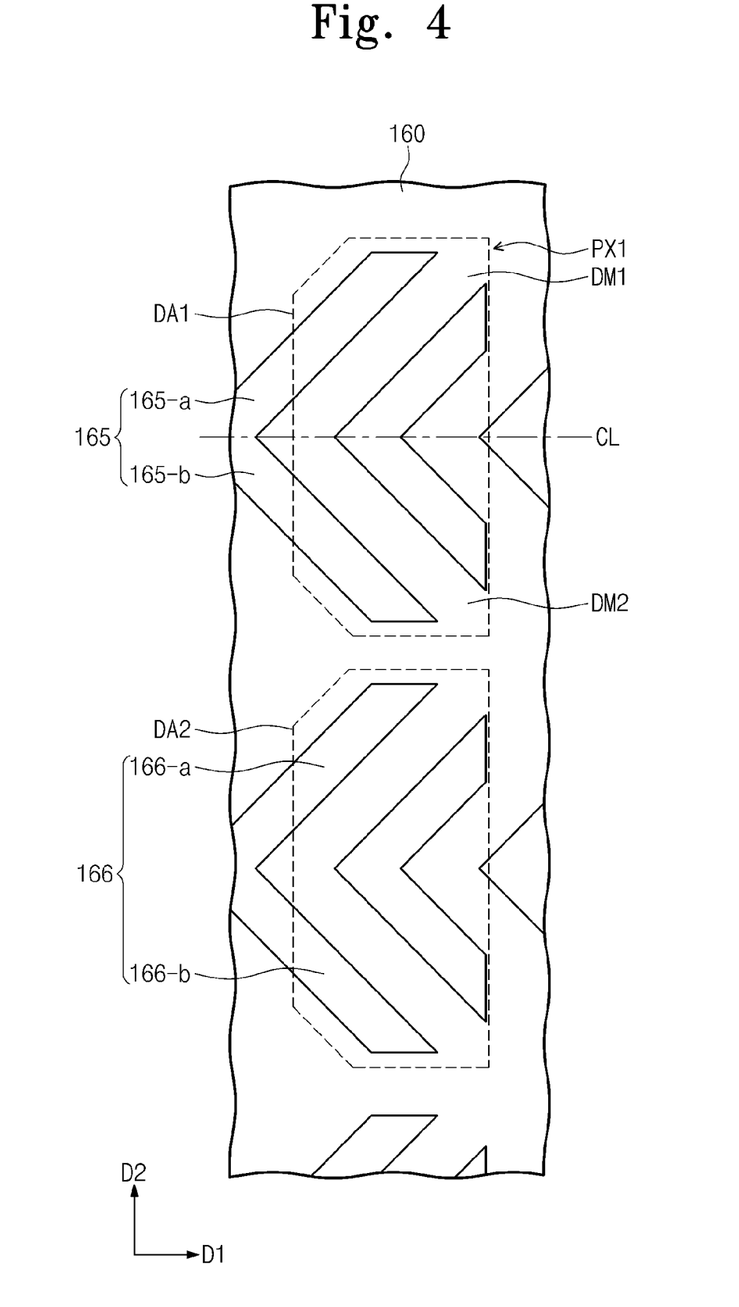
FIG. 4 is an enlarged plan view of a portion of a second electrode of the display panel of FIG. 2, according to exemplary embodiments.

FIG. 4 is an enlarged plan view of a portion of a second electrode of the display panel of FIG. 2, according to exemplary embodiments. The slits 165 of the second electrode 160 may be periodically repeated (e.g., spaced apart from one another) in correspondence with the pixels PX. As such, FIG. 4 illustrates slits 165 corresponding to a first display region DA1 and a second display region DA2 of the first pixel PX1 and the second pixel PX2, respectively.

Referring to FIG. 4, a first slit 165 may be at least partially disposed in the first display region DA1 and a second slit 166 may be at least partially disposed in the second display region DA2. The first display region DA1 may include a plurality of domains. For example, the plurality of domains may include a first domain DM1 and a second domain DM2 that are disposed at corresponding sides of a dividing (e.g., center) line CL passing through the first pixel PX1, e.g., passing through a center portion of the first display region DA1 and extending in the first direction D1. In this manner, the first domain DM1 and the second domain DM2 may be arranged (e.g., spaced apart from one another) in the second direction D2.

In exemplary embodiments, the first slit 165 includes a bent shape with branches extending in different directions in the first domain DM1 and the second domain DM2. For example, the first slit 165 may include a first sub-slit part 165-*a* extending in the first domain DM1 and a second sub-slit part 165-*b* extending in the second domain DM2. In this manner, the first sub-slit part 165-*a* may extend at a positive angle with respect to the dividing line CL passing through the first display region DA1 when viewed in a plan view. The second sub-slit part 165-*b* may extend at a negative angle with respect to the dividing line CL when viewed in a plan view. As such, when a voltage is applied in the liquid crystal layer 200 via the data voltage applied to the first electrode 140, the liquid crystal molecules in each of the first domain DM1 and the second domain DM2 may be rearranged to correspond to the extending direction of each of the first sub-slit part 165-*a* and the second sub-slit part 165-*b*. This may improve visibility of the first pixel PX1. The second slit 166 may be formed substantially similar to the first slit 165 to have a bent shape including branches respectively extending in different directions. In other words, the second slit 166 may include a first sub-slit part 166-*a* and a second sub-slit part 166-*b*.

According to exemplary embodiments, the contact hole CNT extends through the protection layer 130 (and when utilized the first insulating layer 120) to expose the drain electrode DE. The first electrode 140 is connected to the drain electrode DE through the contact hole CNT. The contact hole CNT may be disposed in a region not overlapping the first slit 165 or the second slit 166. For example, the contact hole CNT may be formed on the drain electrode DE formed in the first non-display region NDA1 and the second non-display region NDA2. To this end, the first slit 165 and the second slit 166 are not formed in the first non-display region NDA1 or the second non-display region NDA2. As such, the contact hole CNT may be disposed in a region not overlapping the first slit 165 or the second slit 166. Moreover, transformation of the first slit 165 or the second slit 166 may be prevented when the first slit 165 and the second slit are formed in association with the first pixel PX1 and the second pixel PX2, respectively, as will become more apparent below.

A lithography process using a photoresist formed on the second insulating layer 150 may be utilized to form a slit. In this manner, the photoresist may be formed thicker on the contact hole CNT, and, thereby, formed relatively thinner on the protection layer 130. A degree of reaction of the photoresist during an exposure process may be varied depending on the thickness of the photoresist. As such, a photoresist pattern for a slit disposed on the contact hole CNT may be transformed after a development process is performed. If an electric field is applied in a region including a slit formed using the transformed photoresist pattern, the electric field may be distorted, which may cause misalignment of the liquid crystal molecules of the liquid crystal layer 200. An image may be distorted and the display quality of the liquid crystal display apparatus may be deteriorated. According to exemplary embodiments, however, the contact hole CNT does not overlap the slit 165. This may prevent the image distortion caused by the transformed slit. As such, display quality of the liquid crystal display apparatus 1000 may be improved.

Figure 5:
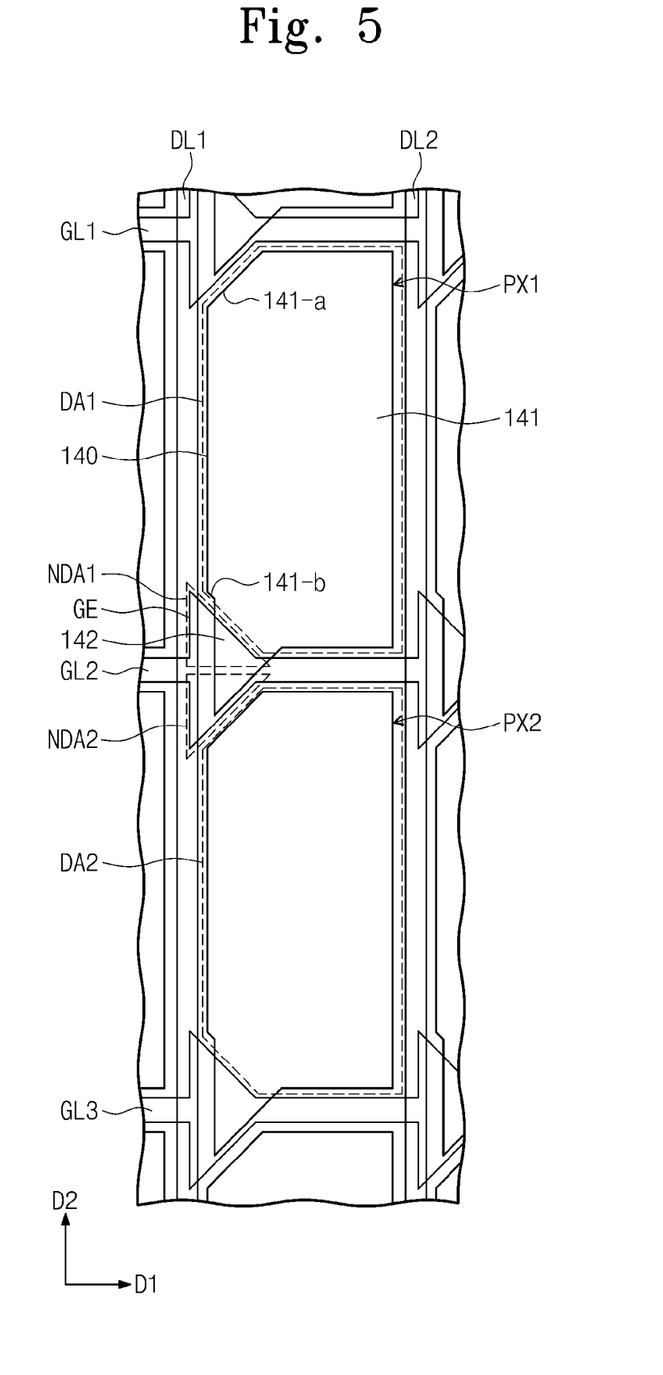
FIG. 5 is an enlarged plan view of a portion of a first electrode of the display panel of FIG. 2, according to exemplary embodiments.

FIG. 5 is an enlarged plan view of a portion of a first electrode of the display panel of FIG. 2, according to exemplary embodiments. A first electrode 140 may be periodically repeated in each of the pixels PX. As such, first electrodes 140 disposed in association with the first pixel PX1 and the second pixel PX2, respectively, are illustrated as examples in FIG. 5.

Referring to FIG. 5, the first substrate 100 may include the first pixel PX1 and the second pixel PX2 arranged in (e.g., spaced apart from one another) in the second direction D2. It is noted that the elements and functions of the pixels PX, such as the first pixel PX1 and the second pixel PX2, may be substantially similar, and, therefore, to avoid obscuring exemplary embodiments described herein, the first electrode 140 of the first pixel PX1 will be described as a representative first electrode 140.

The first pixel PX1 may include a first electrode 140 having a field portion 141 and a contact portion 142. The field portion 141 may overlap the slit 165 of the second electrode 160. The field portion 141 may include one or more sides that extend in correspondence with the shape of the slit 165. In this manner, the field portion 141 may generate a uniform fringe field. That is, the first electrode 140 may include a first side 141-a and a second side 141-b that extend parallel (or substantially parallel) to the first sub-slit part 165-a and the second sub-slit part 165-b, respectively. Since the first side 141-a may be parallel to the first sub-slit part 165-a, a distance between the first side 141-a and the first sub-slit part 165-a may be constant (or substantially constant). In this manner, the fringe field generated between the first side 141-a and the first sub-slit part 165-a may be uniform (or substantially uniform). In a similar manner, since a distance between the second side 141-b and the second sub-slit part 165-b may be constant (or substantially constant), a fringe field generated between the second side 141-b and the second sub-slit part 165-b may be uniform (or substantially uniform). To this end, the first pixel PX1 may generate an undistorted image due to the uniform fringe field.

Although the second side 141-b is illustrated as being relatively short in FIG. 5, exemplary embodiments are not limited thereto. That is, the second side 141-b may extend further and be parallel to the second sub-slit part 165-b based on a configuration of the first display region DA1 and the first non-display region NDA1.

Figure 6:
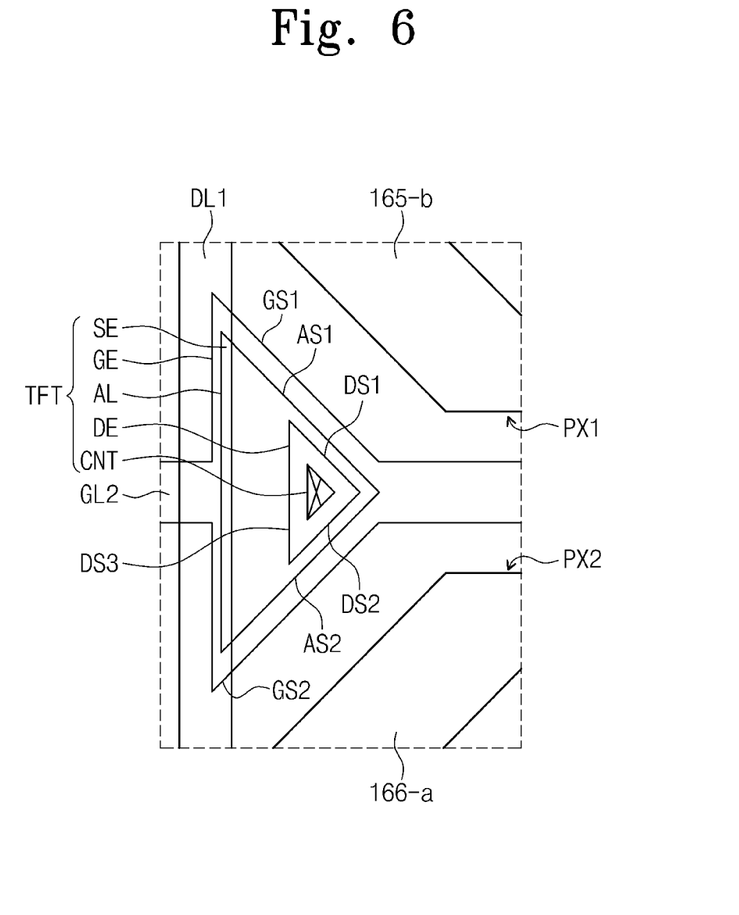
FIG. 6 is an enlarged plan view of a thin film transistor of the display panel of FIG. 2, according to exemplary embodiments.

FIG. 6 is an enlarged plan view of a thin film transistor of the display panel of FIG. 2, according to exemplary embodiments. It is noted that the thin film transistors TFTs of the pixels PX may have substantially the same structure and function. As such, the thin film transistor TFT of the first pixel PX1 is described and illustrated as an example in FIG. 6.

Referring to FIGS. 2, 3, and 6, the thin film transistor TFT may be shaped to improve the aperture ratio of the first pixel PX1. That is, the thin film transistor TFT may be disposed between the first pixel PX1 and the second pixel PX2 in respective non-display regions thereof, such that a first portion of the thin film transistor TFT may be disposed in the first non-display region NDA1 and a second portion of the thin film transistor TFT may be disposed in the second non-display region NDA2. At least one of the drain electrode DE, the semiconductor layer AL, and the gate electrode GE of the thin film transistor TFT may include a side extending parallel (or substantially parallel) to portions of the slits 165 and 166 of the first pixel PX1 and the second PX2 adjacent to the thin film transistor TFT, as will become more apparent below.

For example, the drain electrode DE may include a first drain electrode side DS 1 extending parallel (or substantially parallel) to the second sub-slit part 165-b of the first pixel PX1, and a second drain electrode side DS2 extending parallel (or substantially parallel) to the first sub-slit part 166-a of the second pixel PX2 in a plan view. The first drain electrode side DS 1 may extend toward the second pixel PX2 and the second drain electrode side DS2 may extend toward the second pixel PX2, and, thereby, may connect with one another over the second gate line GL2 to be disposed in the first pixel PX1 and the second pixel PX2, respectively. In this manner a portion of the first drain electrode side DS 1 may be disposed in the first non-display region NDA1 and a portion of the second drain electrode side DS2 may be disposed in the second non-display region NDA2. The drain electrode DE may further include a third drain electrode side DS3 extending parallel (or substantially parallel) to the first data line DL1. In this manner, the third drain electrode side DS3 may extend between the first non-display region NDA1 and the second non-display region NDA2.

The semiconductor layer AL may also have sides respectively extending parallel (or substantially parallel) to the sub-slit parts 165-b and 166-a when viewed in a plan view. That is, the semiconductor layer AL may include a first semiconductor layer side AS 1 and a second semiconductor layer side AS2 that are parallel (or substantially parallel) to the second sub-slit part 165-b of the first slit 165 and the first sub-slit part 166-a of the second slit 166, respectively. To this end, the semiconductor layer AL may include a third side parallel (or substantially parallel) to the first data line DL1.

The gate electrode GE may also have sides respectively extending parallel (or substantially parallel) to the sub-slit parts 165-b and 166-a when viewed in a plan view. In other words, the gate electrode GE may include a first gate electrode side GS1 and a second gate electrode side GS2 that are parallel (or substantially parallel) to the second sub-slit part 165-b of the first slit 165 and the first sub-slit part 166-a of the second slit 166, respectively. To this end, the gate electrode GE may include a third side parallel (or substantially parallel) to the first data line DL1.

According to exemplary embodiments, the drain electrode DE, the semiconductor layer AL, and the gate electrode GE may have triangular shapes in a plan view.

As described above, the drain electrode DE, the semiconductor layer AL, and the gate electrode GE have sides extending parallel (or substantially parallel) to the corresponding sub-slit parts 165-*b* and 166-*a*, such that the aperture ratios of the first pixel PX1 and the second pixel PX2 are increased. In other words, since the thin film transistors TFT and the first side 141-*a* and the second side 141-*b* of the first electrode 140 are formed to correspond to the shapes of the sub-slit parts 165-*b* and 166-*a*, the area of the first display region DA1 configured to display an image may be increased and the area of the first non-display region NDA1 may be reduced. As a result, the aperture ratio of the first and second pixels PX1 and PX2 are improved.

The source electrode SE may be formed by the first data line DL1. That is, the first data line DL1 may overlap at least a portion of the semiconductor layer AL. The overlapping portion of the first data line DL1 may form the source electrode SE.

Figure 7:
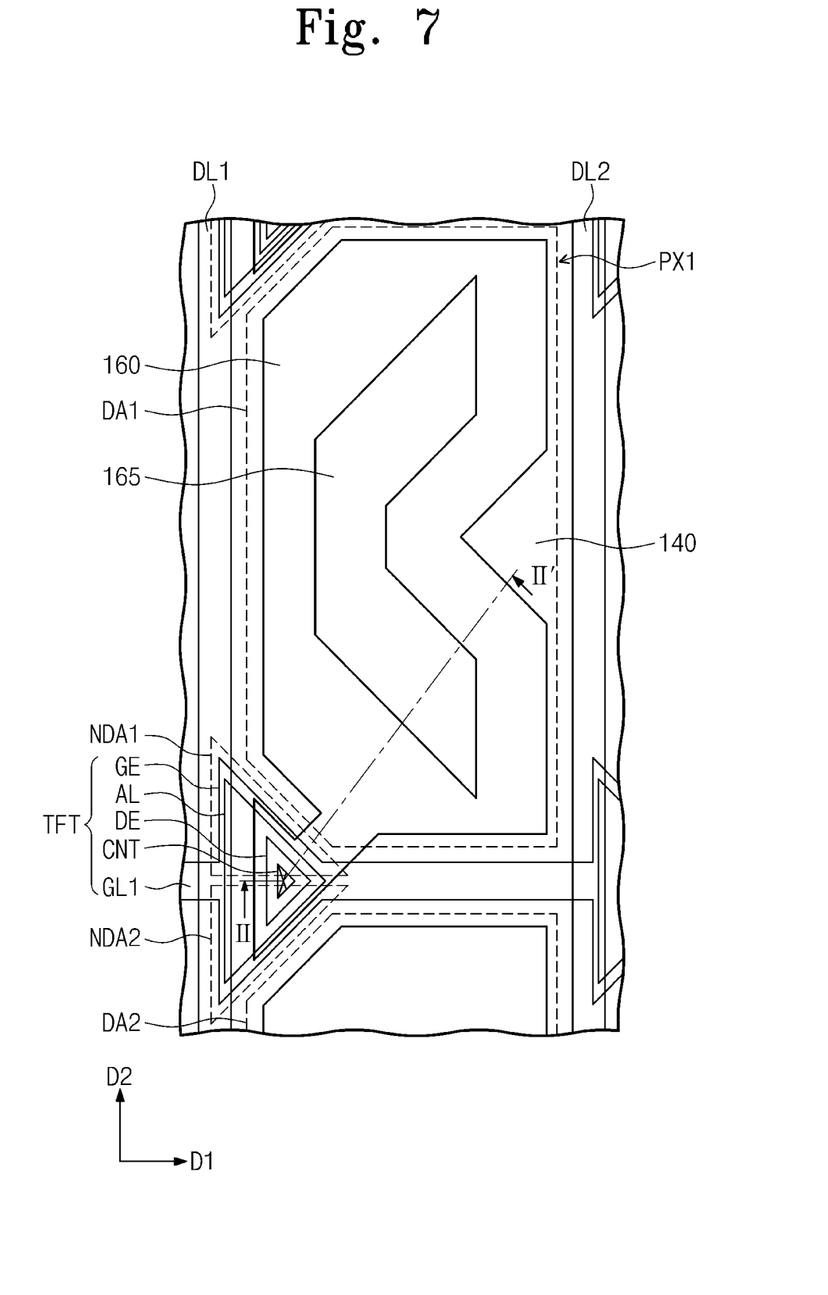
FIG. 7 is an enlarged plan view of a portion of a liquid crystal display apparatus, according to exemplary embodiments.
Figure 8:
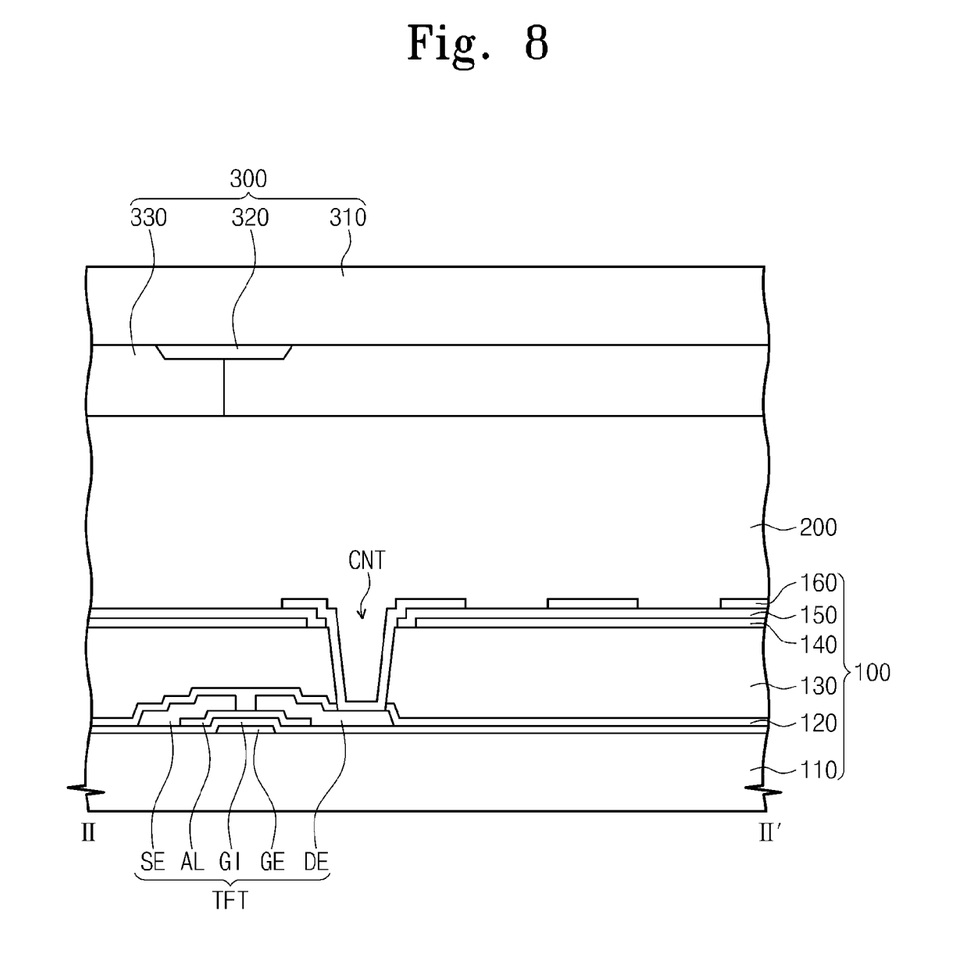
FIG. 8 is a cross-sectional view of the liquid crystal display apparatus of FIG. 7 taken along a sectional line II-II', according to exemplary embodiments.

FIG. 7 is an enlarged plan view of a portion of a liquid crystal display apparatus, according to exemplary embodiments. FIG. 8 is a cross-sectional view of the liquid crystal display apparatus of FIG. 7 taken along sectional line II-II'. The pixels of the liquid crystal display apparatus of FIGS. 7 and 8 may have substantially the same structure and function. As such, to avoid obscuring exemplary embodiments described herein, FIGS. 7 and 8 illustrate and are described in association with an exemplary first pixel PX1. To this end, the liquid crystal display of FIGS. 7 and 8 are substantially similar to the liquid crystal display 1000 of FIGS. 2 and 3. As such, duplicative descriptions will be omitted or mentioned briefly.

Referring to FIGS. 7 and 8, a first substrate 100 may include a first base substrate 110, a thin film transistor TFT, a protection layer 130, a first electrode 140, a second insulating layer 150, and a second electrode 160. The first substrate 100 may also include a first gate line GL1 extending in a first direction D1 (e.g., a row direction) and a first data line DL1 and a second data line DL2 extending in a second direction D2 (e.g., a column direction).

The thin film transistor TFT may be disposed in the first non-display region NDA1 and the second non-display region ND2 of an adjacent pixel. The thin film transistor TFT may control the generation of an electric field in the liquid crystal layer 200 by selectively providing a data voltage to the first electrode 140 based on a gate signal received via the first gate line GL1. As such, the thin film transistor TFT may control image generation via the first pixel PX1. In this manner, the thin film transistor TFT may include a gate electrode GE, a source electrode SE, and a drain electrode DE.

According to exemplary embodiments, the thin film transistor TFT may be electrically connected to the first gate line GL1, the first data line DL1, and the second electrode 160 to provide a data voltage to the first pixel PX1. The gate electrode GE may extend from the first gate line GL1 and may be formed on the first base substrate 110. A gate insulating layer GI may be disposed on the gate electrode GE. The gate insulating layer GI may cover the gate electrode GE. The gate insulating layer GI may be formed from any suitable material, such as, for example, any suitable organic material, inorganic material, or a combination thereof.

A semiconductor layer AL may be disposed on the gate electrode GE with the gate insulating layer GI disposed therebetween. The source electrode SE may be disposed on a portion of the gate electrode GE with the semiconductor layer AL disposed therebetween. The drain electrode DE may be spaced apart and insulated from the source electrode SE. The drain electrode DE may be disposed on another portion of the gate electrode GE with the semiconductor layer AL disposed therebetween.

In exemplary embodiments, the first electrode 140 receives a common voltage to generate an electric field along with the second electrode 160 in a liquid crystal layer 200. As such, liquid crystal molecules of the liquid crystal layer 200 may be rearranged by the electric field. The first electrode 140 may have a plate-shape disposed on an entire (or substantially entire) surface of first base substrate 110. An opening may be formed in the first electrode 140 to correspond to a contact hole CNT, which is described in more detail below. It is noted that the first electrode 140 may be formed of any suitable transparent conductor, such as, for example, AZO, GZO, ITO, IZO, etc. It is also contemplated that one or more ICPs may be utilized.

The second insulating layer 150 may be disposed between the first electrode 140 and the second electrode 160 to electrically insulate the first electrode 140 from the second electrode 160. The contact hole CNT may extend through the protection layer 130, the first electrode 140, and the second insulating layer 150 to expose the drain electrode DE. An optional first insulating layer 120 may be disposed between the thin film transistor TFT and the protection layer 130. In this manner, the contact hole CNT may also extend through the first insulating layer 120 to expose the drain electrode DE.

In exemplary embodiments, the second electrode 160 may extend into the contact hole CNT to be electrically connected to the drain electrode DE. The second electrode 160 may control the image generated in the first pixel PX1. That is, the second electrode 160 may receive a data voltage from the thin film transistor TFT to generate the electric field along with the first electrode 140 in the liquid crystal layer 200. In this manner, the liquid crystal molecules may be rearranged by the generated electric field. The second electrode 160 may be formed of any suitable transparent conductor, such as, for example, AZO, GZO, ITO, IZO, etc. It is also contemplated that one or more ICPs may be utilized.

As seen in FIG. 7, the second electrode 160 may include one or more slits 165 disposed in the first display region DA1. A portion of the slits 165 may also be formed in a region where the data lines DL1 to DLm or the gate lines GL1 to GLn are formed.

When a data voltage is applied to the second electrode 160, the first electrode 140 and the second electrode 160 may generate a fringe field including a horizontal electric field and a non-horizontal electric field caused, at least in part, by the slit 165. In this manner, the liquid crystal molecules applied with the horizontal electric field may rotate to be rearranged in a plane parallel (or substantially parallel) to the first base substrate 110 by the horizontal electric field in an initial stage. Thereafter, the liquid crystal molecules applied with a vertical electric field may rotate parallel (or substantially parallel) to the first base substrate 110 by an elastic force caused, at least in part, by the liquid crystal molecules being rearranged by the horizontal electric field. In this manner, the liquid crystal molecules may be applied with and rearranged by a vertical electric field.

Figure 9:
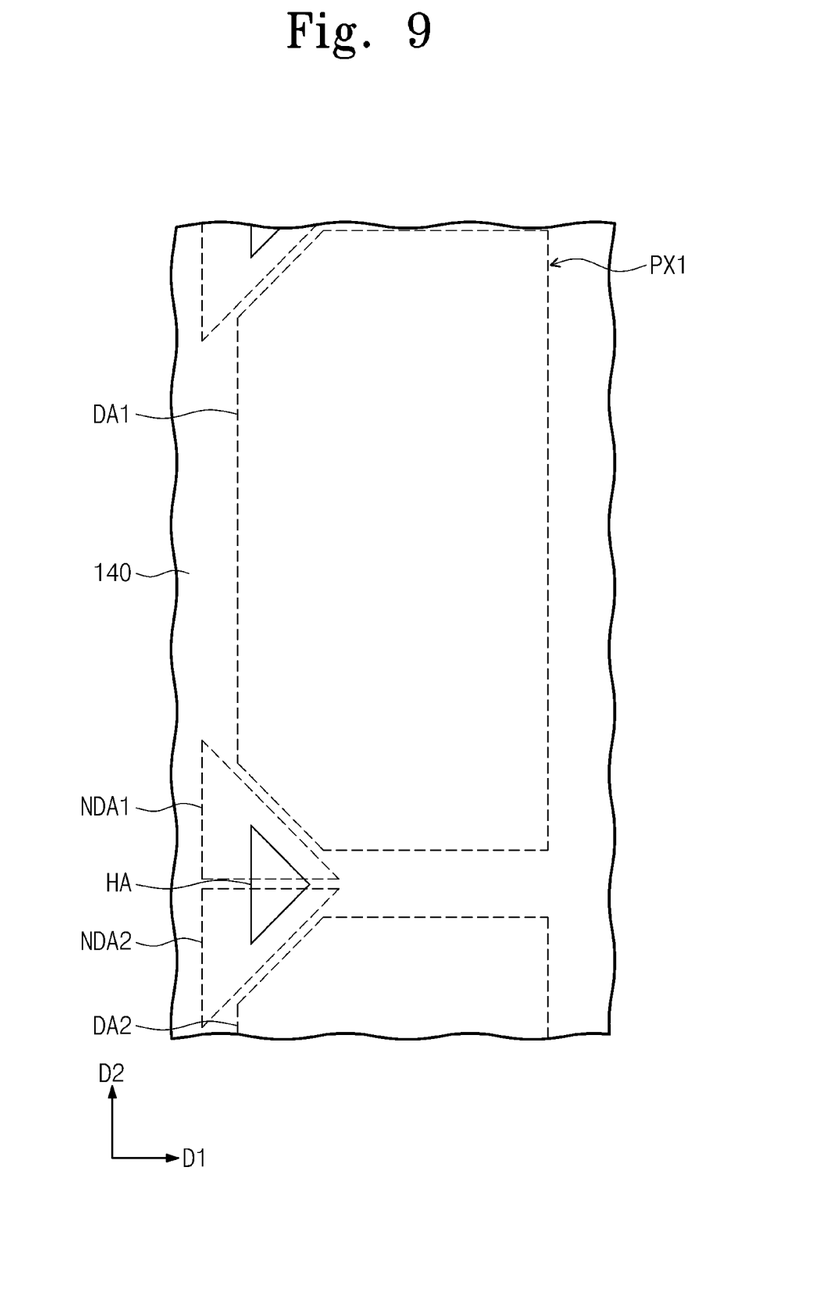
FIG. 9 is an enlarged plan view of a portion of a first electrode of the liquid crystal display apparatus of FIG. 7, according to exemplary embodiments.

FIG. 9 is an enlarged plan view of a portion of a first electrode of the liquid crystal display apparatus of FIG. 7, according to exemplary embodiments. Each of the pixels of the liquid crystal display of FIG. 7 may include a first electrode 140. Therefore, to avoid obscuring exemplary embodiments described herein, the first electrode 140 is described in association with an exemplary first pixel PX1.

As seen in FIG. 9, the first pixel PX1 may include a first display region DA1 and a first non-display region NDA1. The thin film transistor TFT of FIG. 7 may be at least partially disposed in the first non-display region NDA1 and a second non-display region ND2 of an adjacent pixel.

According to exemplary embodiments, the first electrode 140 may have a plate-shape covering the entire (or substantially the entire) surface of the first base substrate 110. The first electrode 140 may include an opening HA corresponding to the contact hole CNT disposed on the drain electrode DE. In this manner, the drain electrode DE may be exposed by the opening HA and the contact hole CNT. The second electrode 160 may be electrically connected to the drain electrode DE through the opening HA.

Figure 10:
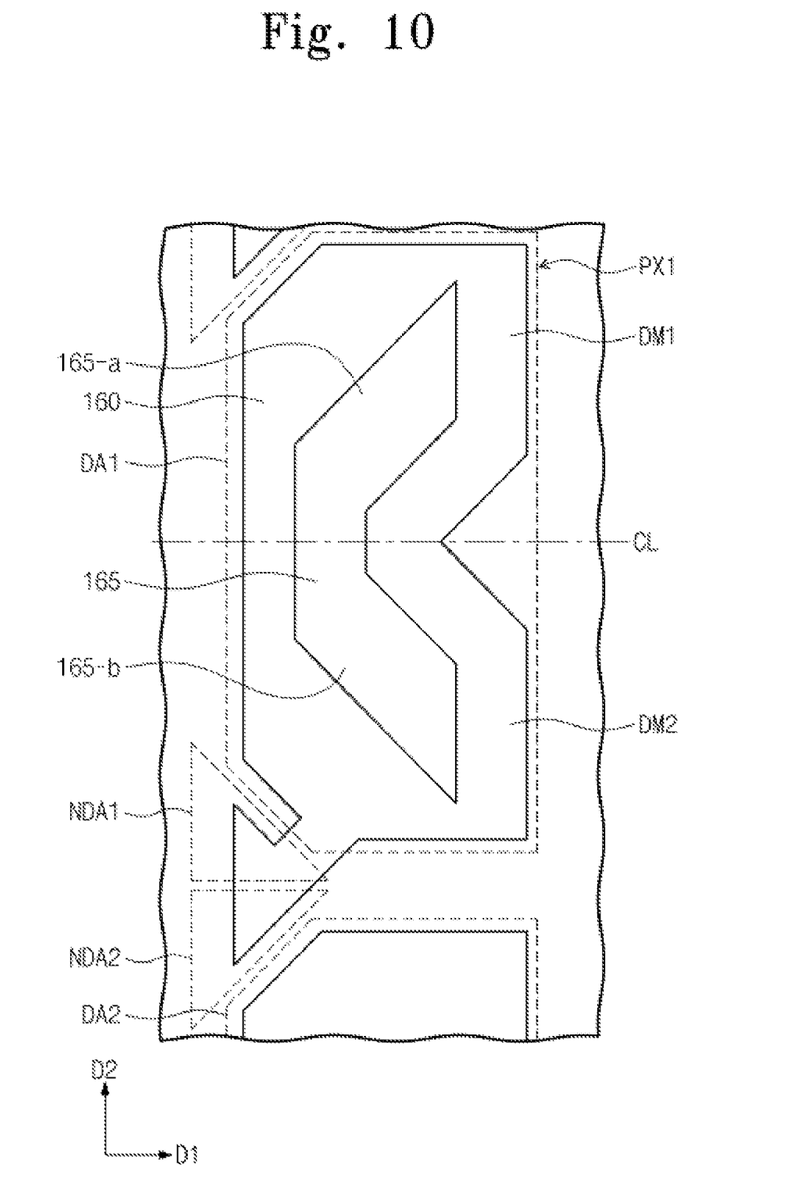
FIG. 10 is an enlarged plan view of a portion of a second electrode of the liquid crystal display apparatus of FIG. 7, according to exemplary embodiments.

FIG. 10 is an enlarged plan view of a portion of a second electrode of the liquid crystal display apparatus of FIG. 7, according to exemplary embodiments. In exemplary embodiments, each of the pixels of the liquid crystal display apparatus of FIG. 7 may include the slit 165. As such, the second electrode 160 including the slit 165 of the first pixel PX1 is described as exemplary of the pixels of the liquid crystal display apparatus of FIG. 7.

Referring to FIG. 10, the slit 165 may be disposed in the first display region DA1 of the first pixel PX1. The first display region DA1 may include a plurality of domains. For example, the plurality of domains may include a first domain DM1 and a second domain DM2 that are disposed at corresponding sides of a dividing (e.g., center) line CL passing through the first pixel PX1, e.g., passing through a center portion of the first display region DA1 in the first direction D1. The first domain DM1 and the second domain DM2 may be arranged (e.g., spaced apart from one another) in the second direction D2.

According to exemplary embodiments, the slit 165 may have a bent shape including branches extending in different directions from the dividing line CL into the first domain DM1 and the second domain DM2, respectively. For example, the slit 165 may include a first sub-slit part 165-a extending in the first domain DM1 and a second sub-slit part 165-b extending in the second domain DM2. The first sub-slit part 165-a may extend at a positive angle with respect to the dividing line CL when viewed in a plan view. The second sub-slit part 165-b may extend at a negative angle with respect to the dividing line CL when viewed in a plan view. As such, when an electric field is applied in the liquid crystal layer 200 based on the data voltage being applied to the second electrode 160, the liquid crystal molecules in each of the first domain DM1 and the second domain DM3 may be rearranged to correspond to the extending direction of each of the sub-slit parts 165-a and 165-b. This may improve visibility of the first pixel PX1, as well as the display quality of the liquid crystal display apparatus.

Adverting to FIG. 7, the contact hole CNT does not overlap with the slit 165. For example, the contact hole CNT may be formed on the drain electrode DE in respective portions of the first non-display region NDA1 and the second non-display region NDA2. It is noted, however, that the slit 165 is not formed in the first display region DA1. As such, the contact hole CNT may be disposed in a region not overlapping the slit 165. To this end, transformation of the slit 165 may be prevented when the slit 165 is formed.

As previously mentioned, a lithography process using a photoresist formed on the second insulating layer 150 may be utilized to form a slit in a convention liquid crystal display apparatus. In this manner, the photoresist may be formed thicker on the contact hole CNT, but may be formed relatively thinner on the protection layer 130. A degree of reaction of the photoresist by an exposure process may be varied depending on the thickness of the photoresist. As such, a photoresist pattern for the slit on the contact hole CNT may be transformed after a development process is performed. When an electric field is applied to the slit formed using the transformed photoresist pattern, the electric field may be distorted to cause misalignment of liquid crystal molecules. An image generated in a corresponding region may be distorted. It is noted, however, that, in exemplary embodiments, the contact hole CNT does not overlap the slit 165. In this manner, image distortion that may otherwise occur when a slit overlaps the contact hole may be prevented, and, as such, display quality may be improved.

Although exemplary embodiments have been described in association with a liquid crystal display implementation, it is contemplated that exemplary embodiments may be utilized in association with other types of displays, such as, for example, an electroluminescent display apparatus, a plasma display apparatus, an electrophoretic display apparatus, and the like.

According to exemplary embodiments, a display apparatus may be configured to prevent transformation of a slit caused, at least in part, when a contact hole and the slit overlap one another. In this manner, image distortion that may result from the transformed slit may be prevented (or otherwise reduced). As such, display quality may be improved.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display apparatus, comprising:
 a first substrate comprising a pixel, the pixel comprising a display region and a non-display region;
 a second substrate disposed on the first substrate; and
 a controllable layer disposed between the first substrate and the second substrate,
 wherein the first substrate further comprises:
  a transistor disposed in the non-display region;
  a protection layer disposed on and covering the transistor;
  a first electrode disposed on the protection layer; and
  a second electrode disposed on the first electrode, the second electrode being insulated from the first electrode and comprising a slit disposed in the display region,
 wherein one of the first electrode and the second electrode is electrically connected to the transistor via a contact hole extending through the protection layer,
 wherein the other of the first electrode and the second electrode is configured to receive a common voltage, and
 wherein the contact hole and the slit do not overlap one another.

2. The display apparatus of claim 1, wherein:
 the slit comprises a first sub-slit part and a second sub-slit part disposed on respective sides of a dividing line dividing the pixel into portions, the dividing extending in a first direction;
 the first sub-slit part extends at a positive angle with respect to the dividing line;
 the second sub-slit extends at a negative angle with respect to the dividing line; and
 the first sub-slit part and the second sub-slit part join at the dividing line.

3. The display apparatus of claim 2, wherein:
the first electrode comprises:
  a field portion overlapping the slit; and
  a contact portion extending from the field portion, the contact portion overlapping the transistor; and
the field portion comprises:
  a first side extending parallel to the first sub-slit part in a plan view; and
  a second side extending parallel to the second sub-slit part in the plan view.

4. The display apparatus of claim 2, wherein:
the transistor comprises:
  a gate electrode;
  a semiconductor layer insulated from and disposed on the gate electrode;
  a source electrode disposed on the semiconductor layer; and
  a drain electrode disposed on the semiconductor layer and insulated from the source electrode;
the drain electrode is electrically connected to the first electrode via the contact hole; and
the drain electrode comprises a first drain electrode side extending parallel to the second sub-slit part in a plan view.

5. The display apparatus of claim 4, wherein the semiconductor layer comprises a first semiconductor layer side extending parallel to the second sub-slit part in the plan view.

6. The display apparatus of claim 5, wherein the gate electrode comprises a first gate electrode side extending parallel to the second sub-slit part in the plan view.

7. The display apparatus of claim 4, wherein:
the first substrate further comprises a neighboring pixel adjacent to the pixel in a second direction crossing the first direction;
the drain electrode further comprises a second drain electrode side extending parallel to a first sub-slit part of the neighboring pixel in the plan view;
the first drain electrode side is disposed in the non-display region of the pixel; and
the second drain electrode side is disposed in the non-display region of the neighboring pixel.

8. The display apparatus of claim 7, wherein the drain electrode further comprises a third drain electrode side extending in the second direction.

9. The display apparatus of claim 8, wherein the drain electrode has a triangular shape in the plan view.

10. The display apparatus of claim 4, wherein:
the first substrate further comprises a gate line and a data line crossing one another;
the gate line and the data line are insulated from one another and are electrically connected to respective portions of the transistor; and
the data line overlaps at least a portion of the semiconductor layer, the overlapping portion of the data line forming the source electrode of the transistor.

11. The display apparatus of claim 1, wherein:
the first electrode is electrically connected to the transistor; and
the second electrode is configured to receive the common voltage.

12. The display apparatus of claim 1, wherein:
the second electrode is electrically connected to the transistor; and
the first electrode is configured to receive the common voltage.

13. The display apparatus of claim 1, further comprising:
an insulating layer disposed between the protection layer and the transistor,
wherein the contact hole extends through the protection layer and the insulating layer, and
wherein the first electrode is electrically connected to the transistor via the contact hole.

14. The display apparatus of claim 1, further comprising:
an insulating layer disposed between the first electrode and the second electrode.

15. The display apparatus of claim 1, wherein the protection layer comprises an organic material, inorganic material, or both the organic material and the inorganic material.

16. The display apparatus of claim 1, wherein the first electrode and the second electrode are transparent electrodes.

17. The display apparatus of claim 1, wherein the controllable layer is one of a liquid crystal layer, an electroluminescent layer, a plasma layer, and an electrophoretic layer.

18. A display panel, comprising:
a substrate comprising a pixel, the pixel comprising a display region and a non-display region;
a transistor disposed on the substrate and in the non-display region;
a protection layer disposed on and covering the transistor;
a first electrode disposed on the protection layer; and
a second electrode disposed on the protection layer, the second electrode being insulated from the first electrode and comprising a slit disposed in the display region,
wherein one of the first electrode and the second electrode is electrically connected to the transistor via a contact hole extending through the protection layer, and
wherein the contact hole and the slit do not overlap one another.

19. The display panel of claim 18, wherein:
a dividing line separates the pixel into a first domain and a second domain;
a first part of the slit disposed in the first domain extends from the dividing line in a first direction;
a second part of the slit disposed in the second domain extends from the dividing line in a second direction different from the first direction.

20. The display panel of claim 18, wherein:
the one of the first electrode and the second electrode comprises:
  a field portion disposed in the display region; and
  a contact portion overlapping a respective portion of the transistor;
the field portion comprises:
  a first side disposed in the first domain and extending in the first direction; and
  a second side disposed in the second domain and extending in the second direction.

* * * * *